United States Patent
Yang

(10) Patent No.: US 10,051,238 B2
(45) Date of Patent: Aug. 14, 2018

(54) BANDWIDTH BASED LICENSING SCHEME FOR VIDEO, AUDIO AND/OR MULTIMEDIA CONTENT

(75) Inventor: Charlie X. Yang, Sunnyvale, CA (US)

(73) Assignee: IMAGINE COMMUNICATIONS CORP., Frisco, TX (US)

( * ) Notice: Subject to any disclaimer, the term of this patent is extended or adjusted under 35 U.S.C. 154(b) by 2893 days.

(21) Appl. No.: 11/901,205

(22) Filed: Sep. 14, 2007

(65) Prior Publication Data

US 2008/0069206 A1 Mar. 20, 2008

Related U.S. Application Data

(60) Provisional application No. 60/845,798, filed on Sep. 18, 2006.

(51) Int. Cl.
*H04N 7/173* (2011.01)
*H04N 21/2343* (2011.01)
*H04N 21/254* (2011.01)
*H04N 21/262* (2011.01)
*H04N 21/647* (2011.01)

(52) U.S. Cl.
CPC ..... *H04N 7/17318* (2013.01); *H04N 21/2343* (2013.01); *H04N 21/2541* (2013.01); *H04N 21/26216* (2013.01); *H04N 21/64738* (2013.01); *H04N 21/64761* (2013.01)

(58) Field of Classification Search
USPC ........................................................ 370/464
See application file for complete search history.

(56) References Cited

U.S. PATENT DOCUMENTS

| 5,832,083 | A  | * | 11/1998 | Iwayama et al. ............... 705/51 |
| 6,134,584 | A  | * | 10/2000 | Chang et al. .................. 709/219 |
| 6,801,500 | B1 | * | 10/2004 | Chandran ................... 370/230.1 |
| 6,983,371 | B1 | * | 1/2006 | Hurtado et al. ............... 713/189 |
| 6,996,129 | B2 | * | 2/2006 | Krause et al. ................. 370/487 |
| 2002/0112171 | A1 | * | 8/2002 | Ginter et al. ................. 713/185 |
| 2003/0069964 | A1 | * | 4/2003 | Shteyn et al. ................ 709/225 |
| 2004/0010592 | A1 | * | 1/2004 | Carver et al. ................. 709/226 |
| 2004/0062392 | A1 | | 5/2004 | Morton |
| 2004/0255323 | A1 | * | 12/2004 | Varadarajan et al. .......... 725/25 |
| 2005/0018768 | A1 | * | 1/2005 | Mabey et al. ............. 375/240.2 |
| 2006/0159366 | A1 | | 7/2006 | Darwish |
| 2007/0203714 | A1 | * | 8/2007 | McEnroe et al. ................. 705/1 |
| 2007/0255835 | A1 | * | 11/2007 | Coppinger et al. ........... 709/226 |
| 2008/0215886 | A1 | * | 9/2008 | Nakagawa et al. ........... 713/171 |

* cited by examiner

*Primary Examiner* — Tsan-Yu J Huang
(74) *Attorney, Agent, or Firm* — Tarolli, Sundheim, Covell & Tummino LLP

(57) ABSTRACT

Methods and apparatus are provided for licensing service providers to process video, audio and/or multimedia content using a video processing device. A license key indicative of a license for an amount of bandwidth is generated. The license key is used at the video processing device to enforce the license based on whether there is sufficient licensed bandwidth available to accommodate a newly created output transport stream. If there is sufficient licensed bandwidth available, processing of the newly created output transport stream is allowed. If there is insufficient licensed bandwidth available, processing of the newly created output transport stream is denied. The service providers are charged a license fee to use the video processing equipment based on the licensed bandwidth.

11 Claims, 5 Drawing Sheets

BANDWIDTH BASED LICENSING SCHEME FOR VIDEO, AUDIO AND/OR MULTIMEDIA CONTENT

This application claims priority to and the benefit of U.S. Provisional Application No. 60/845,798 filed Sep. 18, 2006, which is incorporated herein by reference in its entirety and for all purposes.

BACKGROUND OF THE INVENTION

The present invention relates to a licensing scheme for content (e.g., video, audio and/or multimedia) provided by a service provider to an end user. The invention is particularly well suited for use with a video processing device having a transrater, such as a statistical multiplexer and/or digital video splicer. The invention can also be used with a video processing device such as universal scalable modulator (USM) where a user guarantees that the bandwidth to be processed will not exceed the hardware capability. End users who receive content processed by any such video processing device can comprise, for example, consumers of television or multimedia programming.

A statistical multiplexer and digital video splicer is a device that provides digital video processing for, e.g., grooming, statistical multiplexing, transrating and digital program insertion (DPI). An example multiplexer/splicer is the broadcast network processor ("BNP") and modular video processor ("MVP") manufactured by RGB Networks, Inc. of Sunnyvale, Calif., USA.

A low delay VOD/SDV statistical multiplexer is a device that provides real-time video processing for interactive, personalized architectures such as video-on-demand (VOD) and switched digital video (SDV). One such multiplexer, known as a "DBM" (Dynamic Bandwidth Manager), is available from RGB Networks, Inc., and enables cable television operators, for example, to deliver 50% more programming on their existing network without costly network re-architecture and upgrades. High density VOD and SDV bandwidth optimization, as well as quick 'trick play' functions are provided by the RGB DBM. Moreover, the RGB DBM works transparently with existing servers, resource managers, modulators and set-top boxes.

A statistical multiplexer and splicer can also be used in the telco market to handle advanced codec (H.264) and MPEG2. An example of such a product is the MVP offered by RGB Networks A USM is a device that provides high density multi-service digital edge QAM modulation and upconversion. A USM offered by RGB Networks, Inc. supports video-on-demand (VOD), switched digital video and M-CMTS architectures.

It would be advantageous to provide a means to enable the licensing of video, audio and/or multimedia content or the like when such content is processed by a multiplexer or splicer device such as a BNP, DBM, MVP or USM. To date, such schemes have been considered to be too confusing and difficult for both equipment providers (vendors) and their customers (e.g., cable, satellite and multimedia service providers).

Licensing schemes previously proposed in the art are based on the number of programs, the number of transrated videos, and/or the number of transport streams delivered to a user with different permutations and restrictions. The service provider using the equipment has to consider how many high definition (HD) streams, standard definition (SD) streams, still pictures, single-program transport streams (SPTS), multiple-program transport streams (MPTS), programs with transrated video, programs without video, etc. are provided in order to figure out how many licenses are needed. The equipment vendor has to implement a complicated scheme taking all of the possible combinations into account in order to decide how to add and remove licenses for the different possible applications of the equipment. These requirements and the complexity thereof increase both development time and cost, as well as the support cost, for the devices necessary to process the video, audio and/or multimedia streams. The vendor (equipment provider) will also lose revenue when many non-transrated video and other streams pass through the devices, as there is no license fee that can be collected. Although such streams consume resources, they do not generate revenue with the current licensing schemes.

SUMMARY OF THE INVENTION

In order to overcome the problems encountered by the prior art, the present invention provides a licensing scheme that collects licensing fees based on a processed output transport stream bandwidth. In one embodiment, the total output stream bandwidth is used as a measure of the license fee to be charged. A preferred implementation of the present invention requires a device to have a rate shaping capability, in order to ensure that the bandwidth can be maintained at the device output or to enable the user to guarantee the bandwidth.

Licensing fees are collected from the service provider by a vendor (e.g., manufacturer) of video, audio and/or multimedia processing equipment based on the amount of bandwidth utilized by content processed by the equipment ("bandwidth resource usage"). The user of the vendor's equipment (e.g., a cable television, satellite television, or streaming multimedia service provider) will know what the targeted output bandwidth is. The service provider does not need to worry about how many programs can be fit into one output transport stream (TS). Instead, the service provider will have the full flexibility to trade off the quality and quantity of the services (e.g., video, audio, multimedia) processed by the system and for which license fees will have to be paid to the equipment vendor. With new coder-decoder integrated circuit chips (codecs) and better algorithms emerging, service providers can benefit immediately by processing and transporting more programs through the equipment provided by the vendor. The vendor can also simplify the licensing management to lower the development and support cost of the hardware and software systems that process the content provided to end users by the service provider. The vendor also can collect previously uncollectible license fees, e.g., for streams that are not transrated by the hardware and software systems provided by the vendor.

The implementation can be based on a multiplexer/splicer (e.g., BNP, DBM, USM, or MVP) with a rate shaping capability. The license generator can be implemented using a web server to allow the service provider (user) to enter a desired bandwidth, type of license and rate shaping device identifier (ID). The rate shaping device ID can be, for example, a compact flash serial number or other unique ID for the device. The license server can generate a unique license key based on the above information using MD5 or another suitable encryption method. The generated license can be sent to a rate-shaping device via a graphical user interface (GUI), Simple Network Management Protocol (SNMP) or other supported protocol. The device can decrypt the license to determine the total amount of licensed bandwidth.

When a user creates an output transport stream with a given bandwidth, the software will check for the total bandwidth included in the purchased license. If there is enough licensed bandwidth to accommodate the user's request, a valid output transport stream is created. Otherwise, the software will reject the request. The available license at any given time is the total licensed bandwidth minus the used licensed bandwidth. When the user decides to remove an output transport stream, the bandwidth previously used by that transport stream is freed up for other transport streams to use.

In accordance with various preferred embodiments of the invention, a method is provided for licensing service providers to process content using a video processing device such as a multiplexer/splicer, for example, a BNP, DBM, MVP or USM. A license key indicative of a license for an amount of bandwidth is generated. The license key is used at a video processing device to enforce the license based on whether there is sufficient licensed bandwidth available to accommodate a newly created output transport stream. If there is sufficient licensed bandwidth available, processing of the newly created output transport stream is allowed. If there is insufficient licensed bandwidth available, processing of the newly created output transport stream is denied.

The license key can be indicative of an amount of bandwidth for a particular feature.

The inventive method can also select, from a plurality of video processing engines, one such engine that has sufficient bandwidth to process the newly created output stream if processing of that stream is allowed. The newly created output stream is then assigned to the selected engine. Processing of the newly created output stream is refused if none of the plurality of video processing engines has sufficient bandwidth to process the stream.

The generating step can generate the license key from information entered by a user. Such information can include, for example, a feature to be licensed and an amount of bandwidth desired for that feature.

The license key can be provided to the video processing device via a user interface. The license key provided via the user interface can be compared to a license key generated locally at the video processing device. If the keys do not match, use of the license is denied.

A user interface can be provided to allow a user to create output transport streams in accordance with the license. The user interface can be automatically updated based on the license key to provide user access to licensed features and bandwidth. The user access can permit the creation of output transport streams in accordance with the license.

Apparatus is disclosed for licensing service providers to process content using a video processing device. The apparatus includes a key generator adapted to receive license type and bandwidth information necessary to generate a license key. The key is indicative of a license for an amount of bandwidth allowed for a video processing feature. The apparatus also includes a user interface, a license key processor adapted to receive the key, and a plurality of video processors/engines. The user interface is updated by the license key processor to enable the creation of a transport stream for processing by at least one of the video processors in accordance with the license.

The license key processor can allow processing of the transport stream by at least one of the video processors if there is sufficient licensed bandwidth available, and deny processing of the transport stream if there is insufficient licensed bandwidth available.

The license key processor can also select, from the plurality of video processors, one such processor that has sufficient bandwidth to process the transport stream if processing of that stream is allowed by the license. The transport stream will then be assigned to the selected video processor.

Processing of the transport stream can be refused if none of the plurality of video processors has sufficient bandwidth to process the stream.

The key generator can be adapted to receive the license type and bandwidth information from said user interface. In one possible implementation, the key generator comprises a web server.

A multiplexer/splicer (BNP, DBM, USM, MVP) can have multiple video processors/engines.

DETAILED DESCRIPTION OF THE INVENTION

Figure 1:
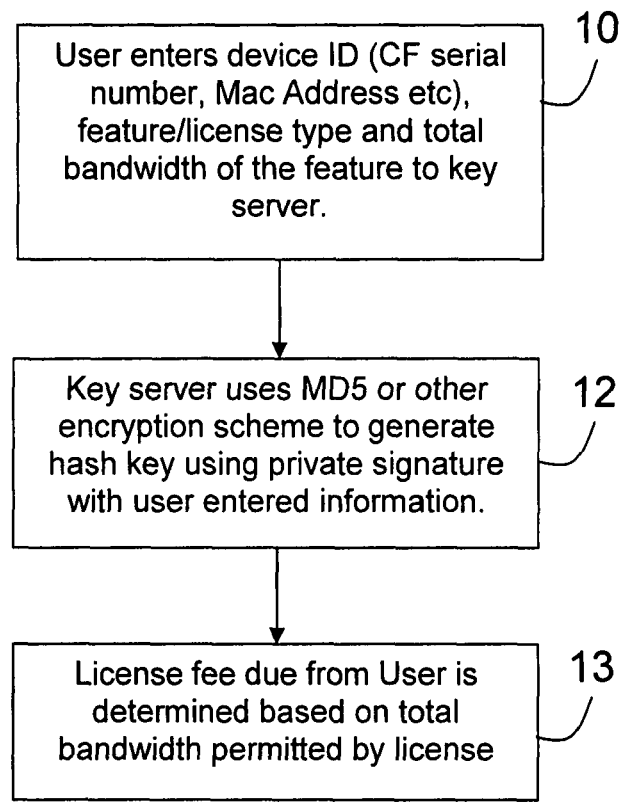
FIG. 1 is a flowchart illustrating the steps required to generate a license key.

FIG. 1 is a flowchart illustrating the steps required to generate a license key. The "user" is the service provider (e.g., cable or satellite television system operator, or multimedia system operator) that wants to use the vendor's (licensor's) equipment to carry the video, audio and/or multimedia content. An encrypted license key is provided.

At box 10, a user enters a device identification (ID), such as a compact flash (CF) card serial number, Mac Address, or the like. A CF card can be used, for example, to provide removable memory for one or more license keys that enable various features of the video processing hardware to be used. Examples of such features, which are enabled by the "license type" are graphic overlay, grooming (i.e., picking various input services to be combined into an output transport stream), advertisement insertion, encryption, SPTS (single program transport stream), and modulation type (e.g., quadrature amplitude modulation—QAM). As well known in the art, QAM types are expressed by the number of symbols in a QAM constellation for a particular implementation, such as QAM 64, QAM 256, etc. By storing the license type in a removable memory such as a CF card, the license can be used in different video processors. This is particularly useful when a video processor malfunctions, and a backup video processor is used in its place. In such a situation, the CF card from the malfunctioning unit is removed and placed into the backup unit to keep the system running. The backup unit, instead of the malfunctioning unit, will then be associated with the device ID carried by the CF card.

In addition to entering the device ID at box 10 of FIG. 1, the user enters the feature/license type and the total bandwidth to be licensed for the feature. This additional information is used along with the device ID by the key server.

Once the stated information has been entered by the user, the key server uses an encryption scheme such as MD5 to generate a hash key, e.g., by using a private signature with the information entered by the user. This step is shown at box 12. The hash key is used by a user to gain access to the feature and its licensed amount of bandwidth at the video processing device (e.g., multiplex/splicer, for example a BNP, DBM, MVP, USM, etc.). Entry of a valid key by the user will enable the processing of transport streams using the licensed features within the licensed bandwidth.

Each key generated by the key server is for a particular feature, and will contain the ID, license type (i.e., the feature to be authorized), and the amount of bandwidth licensed for the feature. A separate key is generated for each feature selected and input by the user. Thus, where a user enters a request for grooming, overlay and encryption, three separate keys will be generated. It is noted that implementations are possible where one key is generated to authorize more than one feature, but the preferred embodiment is to provide a separate key for each feature. Typically, a key will be 64 characters in length, but it can be more or less depending on the amount of information to be conveyed and the security needs of the system.

In order to use the licensed equipment to process the bandwidth permitted by the license key, the user (service provider) will be assessed a license fee. As indicated at box 13 of FIG. 1, the license fee due from the User can be determined based on the total bandwidth permitted by the license. The license fee can be determined and billed at the time the key server generates the key, or at a later time depending on the particular implementation desired.

Figure 2:
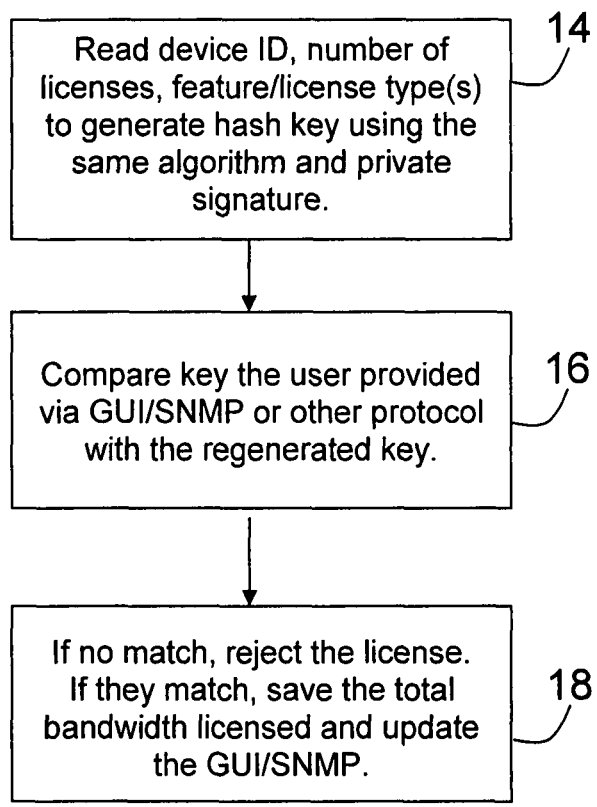
FIG. 2 is a flowchart illustrating how a key is regenerated and processed at the equipment to verify the license.

FIG. 2 is a flowchart illustrating how a key is regenerated and processed at the equipment (video processing device) to verify the license. In an implementation where a CF card is used, for example, the equipment will read the stored key(s) from the CF card. More particularly, as shown at box 14, the device identifier (ID) is read, together with the number of licenses obtained for the equipment and the feature/license types. A hash key is generated from this information using the same algorithm and private signature provided at the key server (as explained above in connection with FIG. 1, box 12). A user will also enter the license key to the equipment (either locally or at a remote location coupled to the equipment via a network) via a user interface, such as a graphical user interface (GUI) or a browser (e.g., via SNMP). At box 16, the key the user provided via a GUI/SNMP or other means is compared with the regenerated key. If the key regenerated at box 14 does not match the key entered by the user, the license is rejected. If, on the other hand, the keys match, the total bandwidth licensed will be saved and the user interface (e.g., GUI or SNMP) will be updated as indicated at box 18. The updating of the GUI/SNMP will result in adding the licensed feature(s) to the user display, indicating to the user the status of the current license(s) (e.g., the features licensed for use with the associated equipment and the licensed bandwidth for each feature).

Entry of the license key(s) by the user can be facilitated by having the key server email or otherwise present the user with the license key(s) in text form that can be copied and pasted into a key field provided by the user interface. For example, a GUI could provide an empty box into which the license key(s) are pasted by the user. This is particularly useful for long keys, such as those that are 64 or more characters in length.

Figure 3:
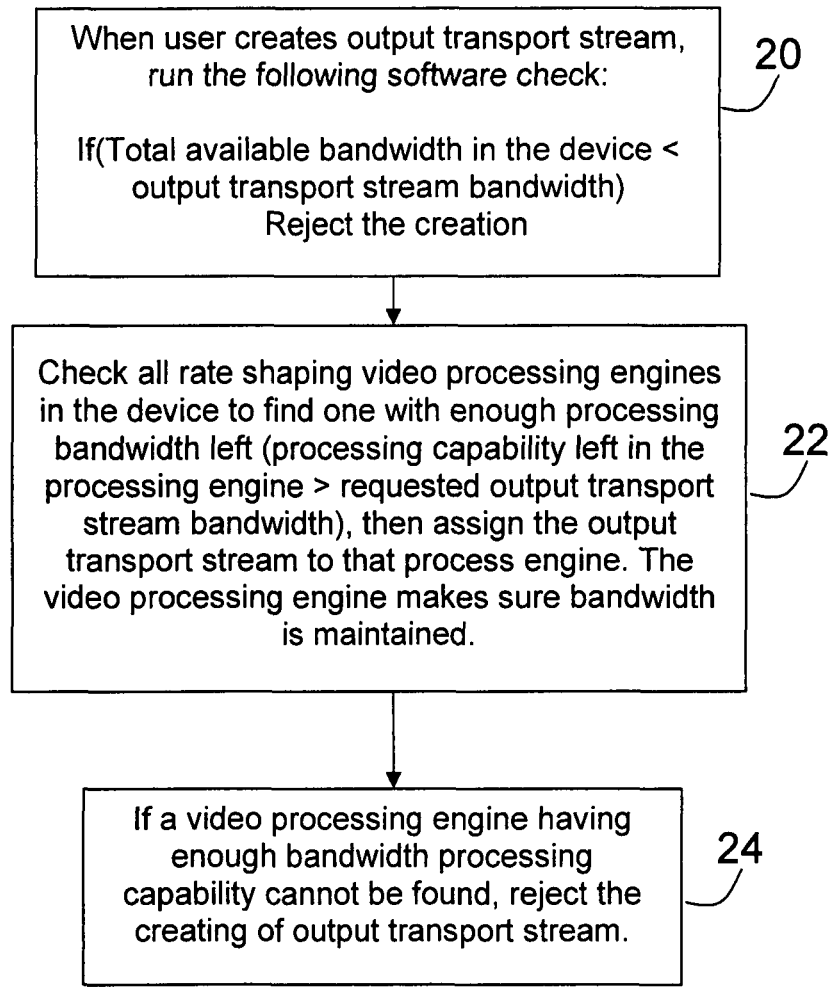
FIG. 3 is a flowchart illustrating how the license is enforced.

FIG. 3 is a flowchart illustrating how the license is enforced. At box 20, a user creates an output transport stream with a plurality of video programs or services available via the license. As noted above, the license specifies the amount of bandwidth available for each licensed feature. After the proposed output transport stream is created by the user, a determination is made as to whether there is enough licensed bandwidth available to accommodate the stream. An output stream that would cause the bandwidth to be exceeded is rejected. Even if there is sufficient licensed bandwidth overall, but there is no video processing engine that has enough bandwidth to handle the output stream, the creation of that output stream will be rejected.

More particularly, as indicated at box 22, if a transport stream created by a user is not rejected at box 20, all of the rate shaping video processing engines in the device are checked to locate one that has enough processing bandwidth for the proposed stream. This can be accomplished by determining if the processing capability remaining in a particular processing engine is greater than the requested output transport stream bandwidth. If so, the output transport stream is assigned to that processing engine. Once the processing engine has the stream assigned to it, the engine will continue to maintain the bandwidth.

If no processing engine is found that has the necessary bandwidth, then the creation of the output stream is rejected, as indicated at box 24. The user will then have to create a different stream with a lower bandwidth requirement. As will be appreciated, it is necessary for the user to have both an adequate license for the bandwidth desired, and sufficient hardware to process this bandwidth.

Figure 4:
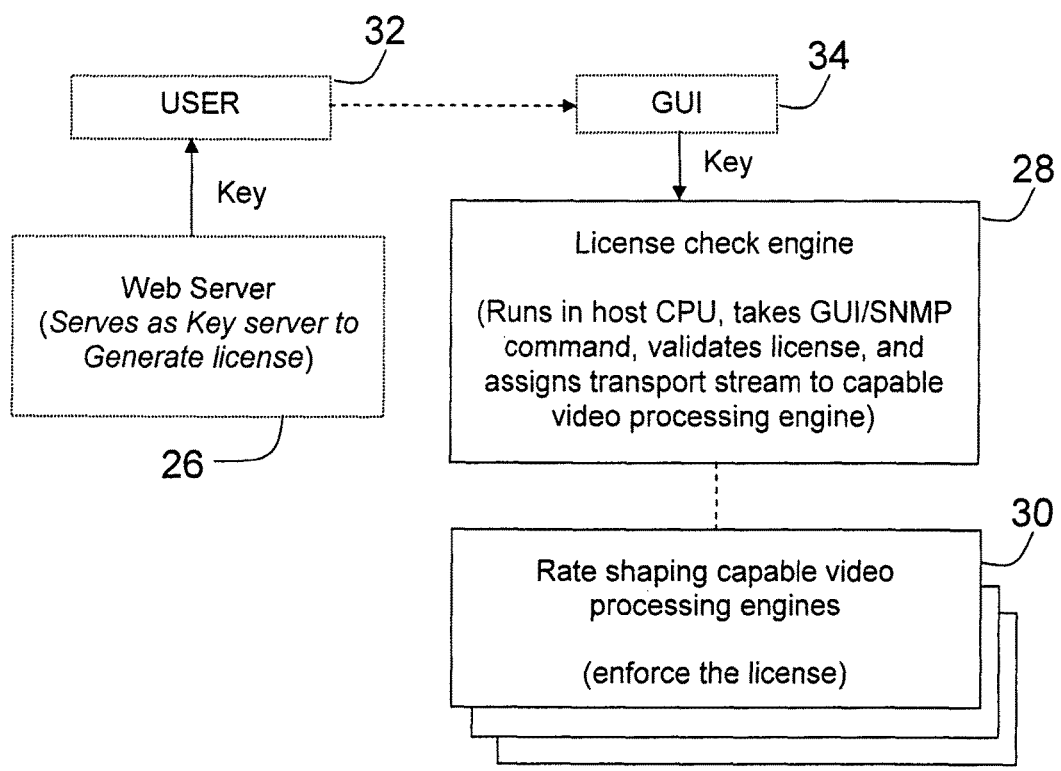
FIG. 4 is a high level block diagram of one way to implement the licensing scheme disclosed herein.

FIG. 4 is a high level block diagram of one way to implement the licensing scheme disclosed herein. A web server 26 is used to generate a license key. The license key is passed to the user 32, for example, by sending an email message to the user. The user then enters the key to a license check engine 28 via a GUI 34. In an implementation where the user is provided with the user key via email, the user can simply copy the key from the email text and paste it into a key field provided by the GUI 34. The GUI 34 also enables the user to create a transport stream by selecting various programs and features in accordance with the license terms. The license check engine 28 will validate the license and assign the user created transport stream to a capable video processing engine. A plurality of rate shaping capable video processing engines 30 is provided to enforce the license. Rate shaping is used to maintain the bandwidth at the output of the device.

Figure 5:
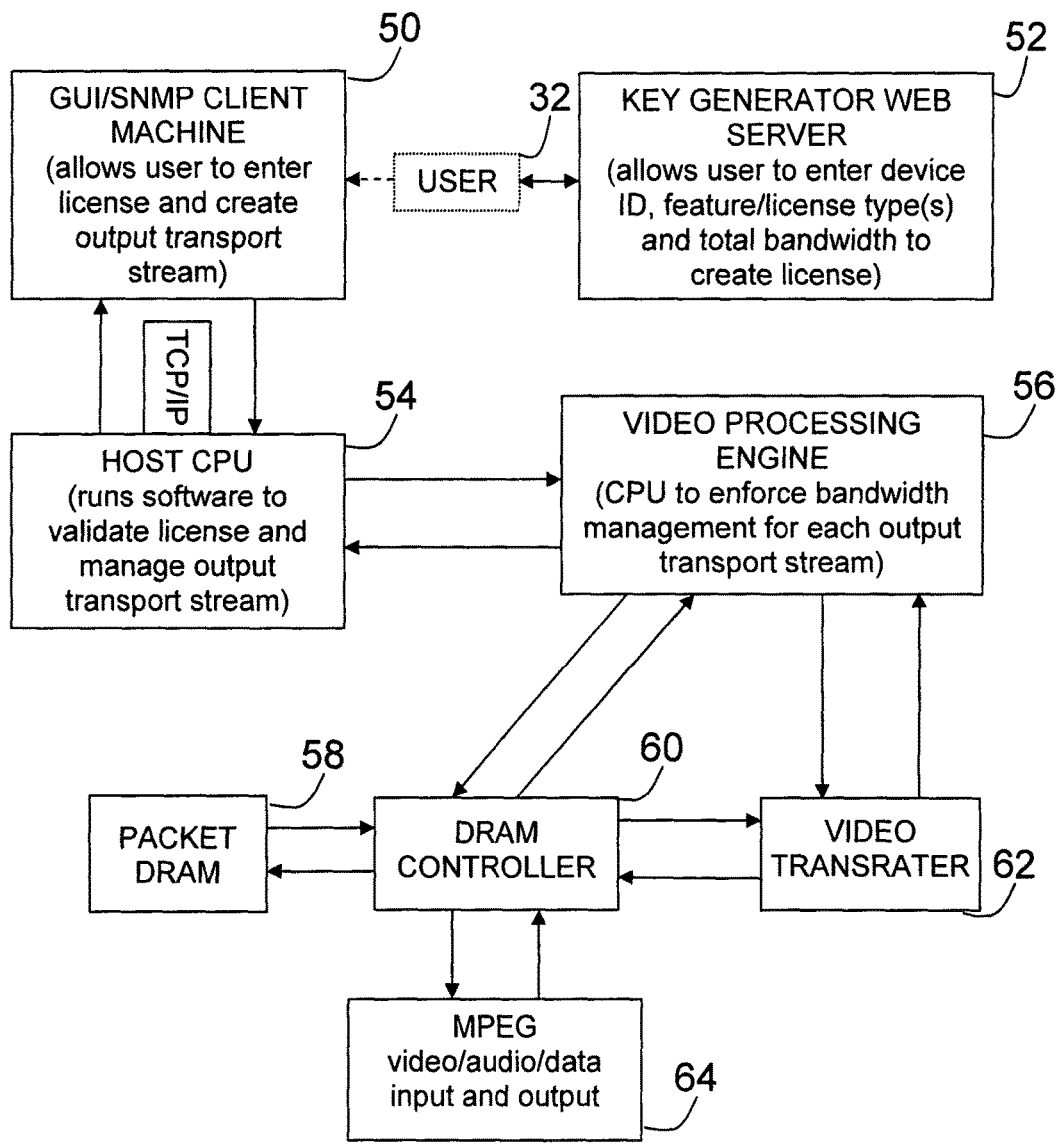
FIG. 5 is a hardware block diagram that provides more detail than the block diagram of FIG. 4.

FIG. 5 is a hardware block diagram that provides more detail than the block diagram of FIG. 4. A key generator web server 52 allows a user (e.g., a service provider using video processing equipment such as a multiplexer/splicer, for example, a BNP, DBM, USM, or MVP) to enter the device ID, feature/license type(s) and a total bandwidth required. A license is created based on this information, and the license key is passed onto the user (e.g., by email). A GUI/SNMP client machine 50 (comparable to GUI 34 of FIG. 4) can be provided in the form of a user terminal, and allows the user to enter the license key and create an output transport stream. The client machine 50 communicates with a host CPU 54 via a known protocol such as HTTP or SNMP. The host CPU runs software to validate the license (functioning as a "license key processor") and manage the output transport stream. A video processing engine 56 enforces the bandwidth management for each output transport stream created by the user.

The hardware also includes dynamic random access memory (packet DRAM 58) and a DRAM controller 60. The DRAM is used for video processing. Separate memory can be provided for other uses (e.g., communication between the host CPU and video processor). Such separate memory can comprise, for example, on-chip memory provided in the video processing engine 56 CPU and/or in the host CPU 54. A video transrater 62 associated with the video processing engine 56 is provided to convert video (e.g., MPEG) streams to a different (e.g., lower) bitrate stream. During the transrating process, the image/video geometry (resolution) can also be changed, and additional image processing can be provided, such as logo insertion, overlaying, and providing subtitles in the video. It is noted that not all streams have to be processed by the transrater. Since even streams that are not transrated will consume bandwidth, the license fees charged to the service provider will cover both transrated and non-transrated streams.

The video content, typically in an MPEG (Moving Picture Experts Group) format well known in the art, is input to and output from the DRAM 58 via the DRAM controller 60 in accordance with conventional techniques. An MPEG processor 64 processes the MPEG data in a conventional manner well known in the art.

It should be appreciated that there will typically be a plurality of video processing engines 56, each associated with a respective video transrater 62, DRAM controller 60, packet DRAM 58 and MPEG processor 64. Each video processing engine 56 will have one or more transport streams assigned to it, depending on the allocation of bandwidth among an entire system. Such an implementation is illustrated in FIG. 4, which shows a plurality of rate shaping capable video processing engines 30.

It should now be appreciated that the invention provides a method for licensing video, audio and/or multimedia content based on an amount of bandwidth needed by the transport streams created by a service provider, such as a cable, telco or satellite television provider. Not only must a license key be obtained for the amount of bandwidth required, but the service provider must have sufficient equipment available to process this bandwidth. Such equipment can comprise, for example, devices such as a BNP, DBM, USM, or MVP that provide various features such as grooming, encryption, QAM type selection, and the like.

The foregoing descriptions of specific embodiments of the invention are presented for purposes of illustration and description. They are not intended to be exhaustive or to limit the invention to the precise forms disclosed, and various modifications and adaptations are possible in view of the above teachings. Therefore, it is intended that the invention not be limited to the particular embodiments disclosed herein, but that the invention will include all embodiments falling within the scope of the appended claims.

The invention claimed is:

1. A method for licensing a service provider to process content using a video processing device comprising the steps of:
   generating a license key indicative of a license for a specified amount of bandwidth for a particular feature that is covered by a license fee, the license fee being charged to the service provider based on a specified amount of bandwidth for the particular feature according to a license;
   enforcing the license, at a video processing device, using the license key based on whether there is sufficient bandwidth available from the specified amount of bandwidth to accommodate a newly created output transport stream related to the particular feature;
   wherein the enforcing comprises at least one of:
      allowing processing of the newly created output transport stream if there is a sufficient amount of bandwidth available to accommodate the newly created output transport stream; and
      denying processing of the newly created output transport stream if there is an insufficient amount of bandwidth available to accommodate the newly created output transport stream.

2. The method of claim 1 further comprising:
   selecting, from a plurality of video processing devices, one such device that has a sufficient amount of bandwidth available to process the newly created output stream if processing of that stream is allowed; and
   assigning the newly created output stream to the selected device.

3. The method of claim 2, wherein processing of the newly created output stream is refused if none of the plurality of video processing devices has sufficient bandwidth to process the stream.

4. The method of claim 1, wherein the generating step generates the license key from information entered by a user, the information including the particular feature to be licensed and an amount of bandwidth desired for the particular feature.

5. The method of claim 1 wherein the license key is provided to the video processing device via a user interface.

6. The method of claim 5, wherein:
   the license key provided via the user interface is compared to a license key generated locally at the video processing device; and
   use of the license is denied if the license key provided via the user interface does not match with the license key generated locally at the video processing device.

7. The method of claim 1, wherein a user interface is provided to allow a user to create output transport streams in accordance with the license.

8. The method of claim 1, wherein:
   a user interface is provided; and
   the user interface is automatically updated based on the license key to provide a user access to licensed features and bandwidth;
   wherein access by the user permits the creation of output transport streams in accordance with the license.

9. The method of claim 1, wherein the particular feature is a feature of the video processing device.

10. The method of claim 9, wherein the feature of the video processing device comprises one of graphic overlay, grooming, advertisement insertion, encryption, single program transport stream, and modulation type and encryption.

11. The method of claim 1, further comprising placing a removable memory into the video processing device, the memory storing the license key to enable the particular feature of the video processing device.

* * * * *